July 17, 1962 H. G. FEISSEL 3,044,696

PROCESS FOR DATA RECORDING

Filed Oct. 9, 1959 3 Sheets-Sheet 1

July 17, 1962 H. G. FEISSEL 3,044,696

PROCESS FOR DATA RECORDING

Filed Oct. 9, 1959 3 Sheets-Sheet 2

July 17, 1962 H. G. FEISSEL 3,044,696

PROCESS FOR DATA RECORDING

Filed Oct. 9, 1959 3 Sheets-Sheet 3

United States Patent Office 3,044,696

Patented July 17, 1962

3,044,696

PROCESS FOR DATA RECORDING

Henri Gérard Feissel, Paris, France, assignor to Compagnie des Machines Bull (Societe Anonyme), Paris, France Filed Oct. 9, 1959, Ser. No. 845,569
Claims priority, application France May 26, 1959
12 Claims. (Cl. 235—61.12)

Figure 1A:
Figure 1B:
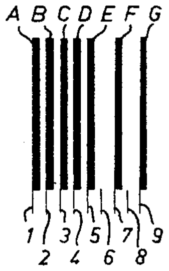
Figure 1C:
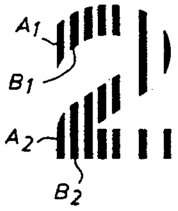
Figure 1D:
Figure 1E:

This invention relates to the recording of data upon supports such as paper sheets or tapes.

In systems employed for dealing with information, it is frequently useful or necessary that certain data carried by documents such as cards, sheets or tapes appear at the same time in a visually legible form and in a form capable of being automatically identified.

It is for this reason that in perforated card systems, the data which are recorded in the form of perfortions arranged according to a code should, in certain cases, be printed on the cards themselves in the form of ordinary writing characters. This involves the use of expensive machines especially designed for this operation.

In certain accounting systems, it has been proposed to print on the documents, at the same time as each character, marks which represent the character according to a code and which are capable of being read automatically, so that the data thus represented can be used directly by the machines carrying out operations on, or by means of, the documents.

This method of representation of data necessitates the use of special machines, each printing element of which must be able to print at a height greater than that of the usual characters.

The attempt has also been made to provide apparatus which are capable of immediately identifying the printed characters. Such apparatus are costly and complicated. It has until now only been possible to simplify the structure thereof by using characters which are not of conventional form.

One object of the invention is to obviate the disadvantages referred to above.

In accordance with the invention there is provided a process for recording data upon a support such as paper sheet or tape, which process comprises forming a representation of each of the characters used for writing data by tracing a fixed number of parallel bar-like marks arranged side by side in such a manner that one of the spaces between adjacent marks, or a fixed number of such spaces, has a given width which differs from the widths of the other spaces, the relative position of the space, or spaces, having said given width, with respect to the other spaces, being different from each different character so represented.

The invention further provides a record bearing document on which a datum is recorded by forming a character representation according to the process.

A document carrying characters formed by markings disposed along parallel lines, enables each character to be identified automatically because of the number and the particular disposition of the lines provided with markings and being visually legible on account of the number and/or the particular disposition of the markings along the said lines.

The characters are obtained according to the invention by using only the graphic elements or portions of these elements forming the coded representation which can be automatically identified.

The invention is based on the fact that the appearance of a continuous trace can be obtained under certain conditions of visual observation by means of separate lines when the intervals separating the adjacent lines are sufficiently reduced. These intervals or spacings can however be detected by an analysis device and are suitable identifying characteristics for the recognition apparatus controlled by this device.

The characters are thus obtained according to the invention by an irregular filigree comprising only parallel lines with a given direction and the irregularities of which along the lines are intended to give the appearance of characters to the entire pattern, but are not detected by the analysis device, although certain irregularities in the direction transversely of the lines do not substantially modify the appearance of these characters, but constitute for these latter characteristics which permit the automatic identification thereof.

Figure 2:
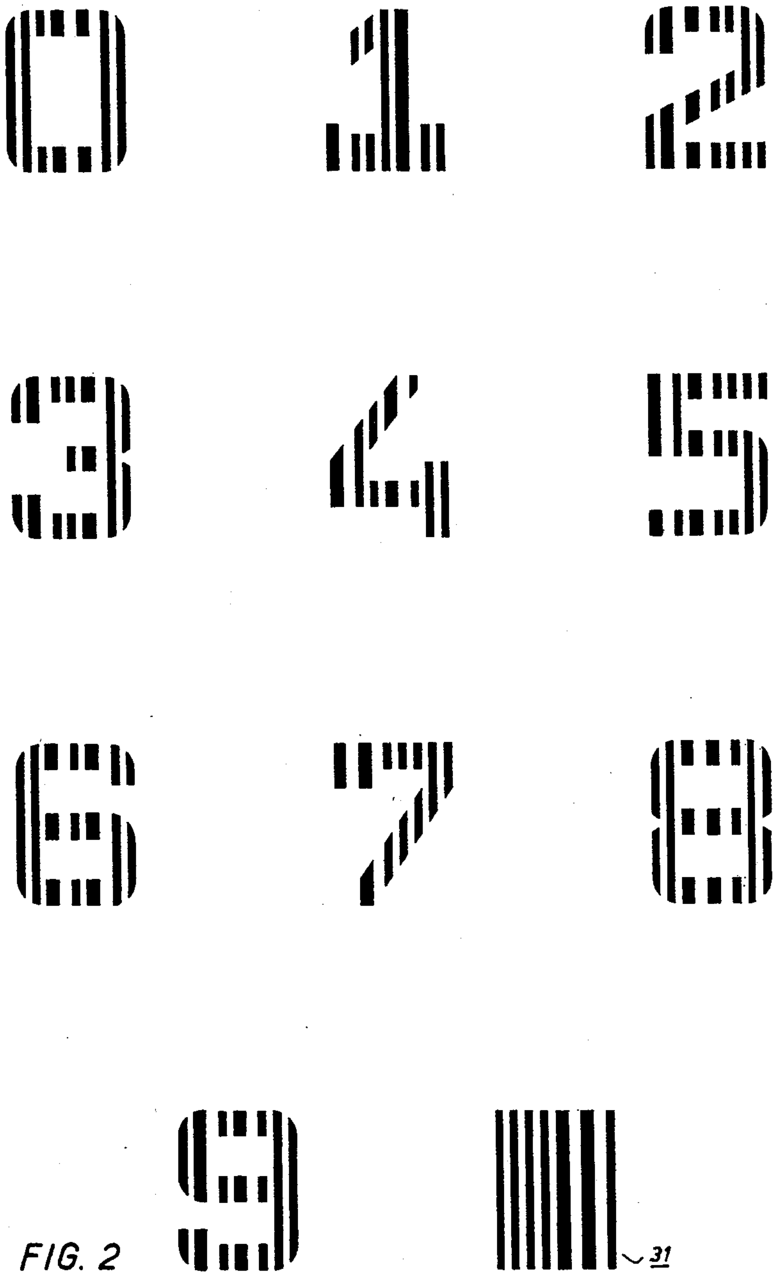
Figure 3:
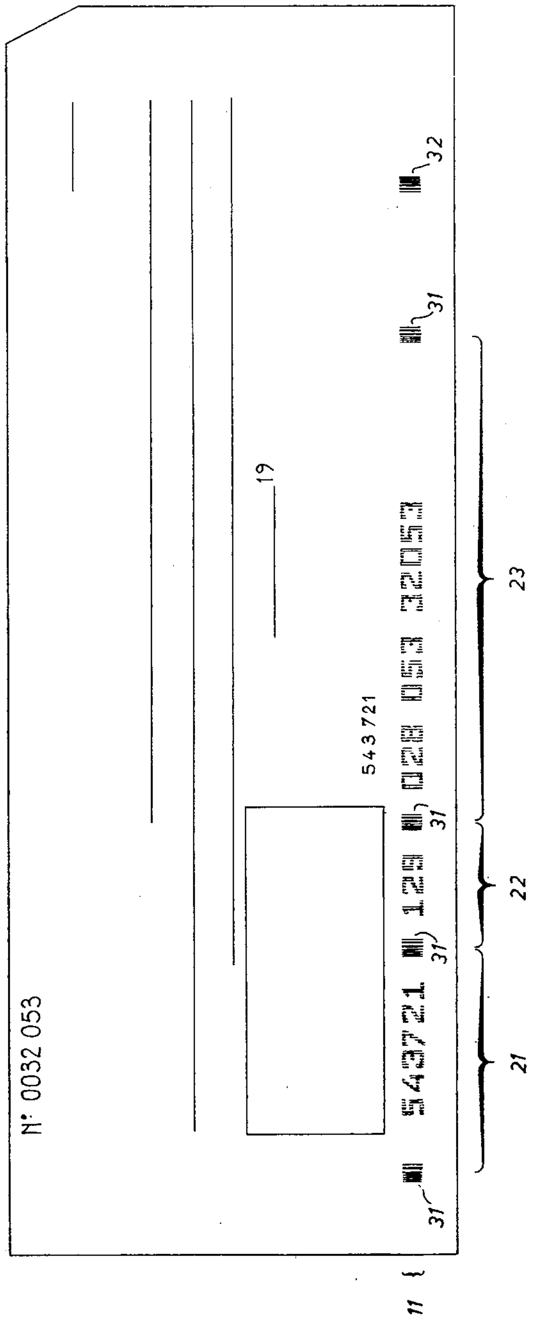

For a better understanding of the invention and to show how it may be carried into effect, the same will now be described, by way of example, with reference to the accompanying drawings, in which:

FIGURE 1 illustrates diagrammatically an example of the representation of a character, FIGURE 2 illustrates an example of the process of representation of characters, and FIGURE 3 illustrates a document bearing characters represented in accordance with the process.

Referring to FIGURE 1, the figure 2 is shown by way of example at (*a*), a representation thereof according to a code conforming to the invention is shown at (*b*), and some of its representations which are simultaneously coded and visually legible in accordance with the invention are shown at (*c*), (*d*) and (*e*).

The code used in this example has a certain number of properties which permit several simultaneous controls and practically eliminate any possibility of error.

The number of bars A, B, C, D, E, F, G in FIGURE 1 (*b*), which serve to represent the character according to this code, is in effect constant for all the characters, the number of intervals or spacings between these bars is consequently also constant, and these spacings can be assumed one or other of two values, the number of spacings of each value also being constant. The result is that the spacing between the extreme bars A and G has a fixed value which is taken to be equal to the uniform width given to these characters.

By means of thin lines 1, 2, 3 . . . 8, 9 in FIGURE 1 (*b*), there are indicated the different index positions along which the bars A, B, C . . . G can be traced to represent the different characters. An index position is said to be "marked" when a bar is placed along this position. This is the case with the positions 1, 2, 3, 4, 5, 7, 9 in FIGURES 1 (*b*), (*c*), (*d*), (*e*).

It will be seen in FIGURE 1 (*c*) that only the portions $A_1$, $A_2$, $B_1$, $B_2$ . . . which are inscribed in the contour of the character shown in (*a*), are preserved of the bars A, B . . . G, so that the general outline of the character is clearly apparent when viewed from a sufficient distance.

The characters thus formed can be analysed by one of the well known optical, magnetic or electrical processes. Such processes have been proposed for analysing and identifying data represented by means of parallel lines disposed according to a code and having suitable optical, magnetic or electrical properties.

The characters of the type described are analysed by displacing the documents carrying them relatively to the analysis device so that successive vertical sections of each character enter a zone known as the reading zone and thus act successively on a detecting member of the analysis device.

The bars or lines forming these characters should of course have suitable optical, magnetic or electrical properties and have in each marked index position a total length sufficient to influence the detecting member of the analysis device.

The analysis apparatus suitable for reading such characters is developed in such a way as to deliver an electrical impulse when a vertical section of a character containing a bar (or portions of a bar) follows, in the reading zone, a section not containing the same.

In the form of representation of the characters as indicated in FIGURE 1 (*c*), the thickness of the bars is constant and smaller than the smallest intervals between bars. This condition is not essential. It is in fact possible, even when the bars do not have a constant thickness, to develop an apparatus which is capable of identifying the characters of the type described and of detecting the errors by using the properties of the code which have previously been referred to.

This method of operation thus permits of forming the characters by means of relatively thick bars so as almost completely to fill the spacing between two adjacent marked positions, and the spacing which must be maintained between one bar and the adjacent marked position should however be fairly large, so that at an instant during the passage of each spacing in the reading zone, no bar portion is in the said zone.

For example, it will be seen from FIGURE 1 (*d*) that the thickness of the bars $E_1$, $E_2$, $E_3$, $F_1$, $F_2$ is greater than distances between adjacent index positions and that the interval or spacing remaining between adjacent bars $E_1$ and $F_1$ disposed along index positions 5 and 7 which are not adjacent is not greater than the spacing between adjacent bars $D_1$ and $E_1$ disposed along adjacent index positions 4 and 5.

FIGURE 1 (*e*) shows another form of representation of characters in accordance with the invention. With a view to ensuring a high contrast between each marked index position and the adjacent interval or spacing, a thin line is printed over the entire height of each of these positions. However, the general outline of the character remains visible.

It is quite evident that other codes with a fixed or variable number of positions can be suitable for the representation of characters according to the invention. It is sufficient for the number of marked positions to be adequate for making visible the outline of each character.

It is for example possible to modify the previously described code in such a way that with bars having a constant thickness, the narrow spacings and the large spacings are respectively equal to twice or four times this thickness. Under these conditions, the bars are not disposed along fixed index positions.

FIGURE 2 shows one method of representation of the figures 1 to 9 according to the invention. According to this method of representation, the thickness of each bar is equal to the width of the adjacent spacing disposed to the right in the figure, the ratio between the marked areas and the unmarked areas is thus the same in any zone inscribed in the contour of the characters, so that the latter appear uniformly coloured. The utility of the reference character 31 shown in FIGURE 2 will be hereinafter explained.

The character impression of the type described by means of a magnetic ink will be advantageously used for recording data on forms capable of being automatically treated.

FIGURE 3 shows one example of the application of this type of impression to a check.

The figures appearing in line 11 of this check are formed according to one of the methods of representation provided by the invention. It will be seen that the beginning and the end of each recording zone 21, 22, 23 are indicated by the special sign 31, the representation of which in accordance with the code being used is chosen so that the reverse code arrangement 32 is not used for the representation of characters. The detection of this code arrangement 32 by the analysis device then has the effect of indicating that the check has been placed back to front in the machine.

In the case where the characters are printed in the manner referred to by means of a magnetic substance, it will be possible to scan the check by means of a magnetic reading head, the air gap of which is parallel to the lines forming the characters. This method of scanning is described for example in French patent specification No. 1,174,001 of the General Electric Company.

The electric signals emitted by the magnetic reading head are differentiated and amplified, and the impulses which are obtained are decoded by means of one of the known methods so as suitably to control the apparatus (sorting machine, calculating machine, printing machine or the like) which are capable of processing the data represented by the characters of the invention. British patent specification No. 650,536, J. F. Crossfield shows by way of example how the impulses resulting from photoelectric analysis of characters are used for controlling a sorting machine.

I claim:

1. A process for representing information in the form of at least one of a group of characters each having an identifiable appearance, said process comprising marking a medium capable of bearing visible information with a succession of spaced and parallel bars arranged in an array corresponding to the visible appearance of at least one of said characters and adapted to simulate a substantially continuous line representation of said character, said bars having a thickness and a spacing which constitute respective characteristics of said marking, and coding at least one of said characteristics to identify the associated character to thus supplement the identifying of the same by the appearance thereof.

2. A process as claimed in claim 1 wherein, for each character, the spacing of the bars is varied to identify the same.

3. A process as claimed in claim 1 wherein, for each character, the thickness of the bars is varied to identify the same.

4. A process as claimed in claim 1, wherein the thickness and spacing are coordinated.

5. A process as claimed in claim 1 comprising providing in each zone wherein a character is marked a plurality of indices indicating all possible positions for said bars.

6. A process as claimed in claim 1, wherein said bars lie in a plurality of parallel rectilinear alignments, comprising providing each alignment with an index mark.

7. An article of manufacture comprising a record bearing medium and, on said medium, a visible substance for representing information in the form of at least one of a group of characters each having an identifiable appearance, and in the form of a succession of spaced and parallel bars arranged in an array corresponding to the visible appearance of at least one of said characters and adapted to simulate a substantially continuous line representation of said character, said bars having a thickness and a spacing which constitute respective characteristics of the associated characters, at least one of said characteristics being in code to identify the associated character to thus supplement the identifying of the same by the appearance thereof.

8. An article as claimed in claim 7 wherein, for each character, the spacing of the bars is varied to identify the same.

9. An article as claimed in claim 7 wherein, for each character, the thickness of the bars is varied to identify the same.

10. An article as claimed in claim 7, wherein the thickness and spacing are coordinated.

11. An article as claimed in claim 7, wherein each character occupies a determinable zone on said medium and said substance further constitutes a plurality of indices indicating a plurality of positions wherein bars may be placed.

12. An article as claimed in claim 7, wherein said bars lie in a plurality of rectilinear alignments.

References Cited in the file of this patent

UNITED STATES PATENTS

| | | |
|---|---|---|
| 2,265,445 | Paris | Dec. 9, 1941 |
| 2,612,994 | Woodland | Oct. 7, 1952 |
| 2,784,392 | Chaimowicz | Mar. 5, 1957 |